United States Patent [19]
Kellerman

[11] Patent Number: 6,107,780
[45] Date of Patent: Aug. 22, 2000

[54] METHOD AND AN ARRANGEMENT RELATING TO TEMPERATURE SENSING IN ELECTRIC CIRCUITRY

[75] Inventor: Michael Kellerman, Åkarp, Sweden

[73] Assignee: Telefonaktiebolaget LM Ericsson, Stockholm, Sweden

[21] Appl. No.: 09/375,747

[22] Filed: Aug. 17, 1999

[30] Foreign Application Priority Data

Aug. 25, 1998 [SE] Sweden .................................. 9802847

[51] Int. Cl.⁷ ......................... H01M 10/44; H01M 10/46
[52] U.S. Cl. ........................................... 320/132; 320/150
[58] Field of Search .................................... 320/106, 132, 320/134, 136, 150, 153, FOR 134, DIG. 21

[56] References Cited

U.S. PATENT DOCUMENTS

| | | | |
|---|---|---|---|
| 5,371,453 | 12/1994 | Fernandez | 320/5 |
| 5,534,765 | 7/1996 | Kreisinger et al. | 320/30 |
| 5,582,928 | 12/1996 | Farley | 429/7 |

FOREIGN PATENT DOCUMENTS 2232495A  12/1990  United Kingdom .

OTHER PUBLICATIONS

Sandh, H.; International–Type Search Report; Jun. 9, 1999; Search Request No. SE98/00961; pp. 1–4.

*Primary Examiner*—Edward H. Tso
*Attorney, Agent, or Firm*—Jenkens & Gilchrist, P.C.

[57] ABSTRACT

It is shown a method and an apparatus for determining a temperature of a battery pack connected via a single communication line to an electric device. The battery pack and electric device both include control and signaling units capable of exchanging digital signal sequences. The batter pack includes an impedance unit having a temperature dependent impedance value. Signaling between the battery pack and the electric device is followed by a sequence of steps where the control and signaling unit of the battery pack is disconnected from the communication line and the temperature dependent impedance unit is connected to the communication line. Electric current is supplied to the impedance unit via the communication line and a voltage level is measured on the communication line. Then an impedance value is calculated based on the supplied current level and the measured voltage level. An interpretation of the calculated impedance value as a temperature of the battery pack is then performed, followed by disconnection of the temperature dependent impedance unit, and reconnection of the control and signaling unit of the battery pack to the communication line.

17 Claims, 3 Drawing Sheets

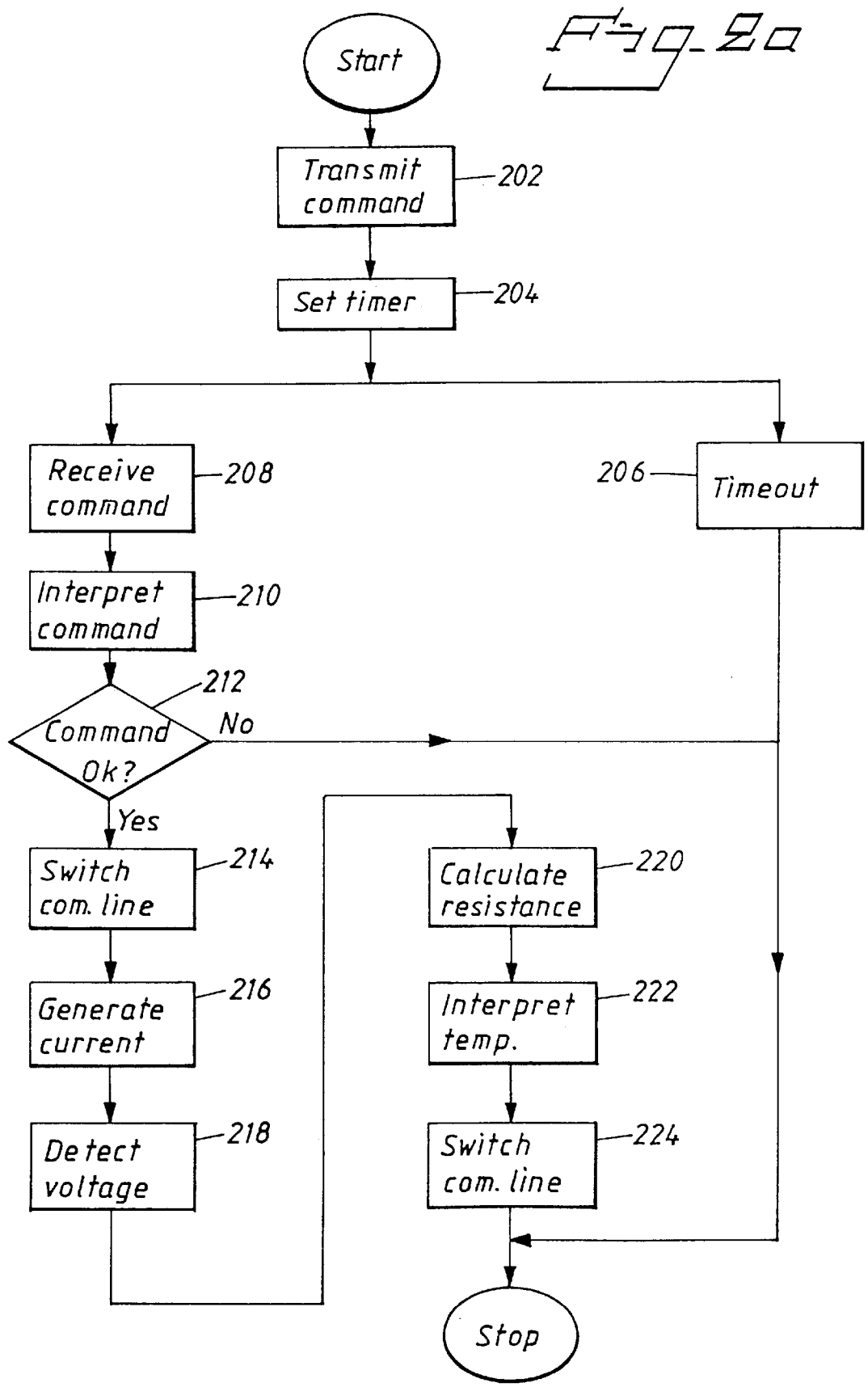

METHOD AND AN ARRANGEMENT RELATING TO TEMPERATURE SENSING IN ELECTRIC CIRCUITRY

TECHNICAL FIELD OF THE INVENTION

The present invention relates to a method and an apparatus for enabling exchange of temperature information between an electric device and a battery pack attached to the device. More specifically, the invention relates to a method and an apparatus for enabling exchange of both analog temperature information and digital information via a single electric communication line.

DESCRIPTION OF RELATED ART

When charging batteries of a battery pack connected to an electric device such as a mobile telephone, or indeed any battery powered electric device, it is often of vital importance to have control over the temperature of the batteries. If the temperature of a battery gets too high, the battery may be damaged or even explode and by that damage the device to which the battery is attached. However, a certain increase of temperature during charging is usually unavoidable, and in fact usually quite harmless. Nevertheless, there are limits within which the temperature of a battery should be kept during charging. The temperature limits may vary between different types of batteries due to the fact that e.g. the chemistry may vary between the battery types. In any case, it is desirable to obtain reliable and regular measurements of the temperature of the batteries connected to the device.

To enable simple and regular control of the temperature of a battery pack attached to a device, it is necessary to have temperature sensing means located close to the battery cells. The sensing means should be readily accessible to the device to which the battery is attached. A very common and simple solution is to make use of an impedance unit with temperature dependent level of impedance, such as a NTC-thermistor or PTC-thermistor having, respectively, a negative and a positive temperature coefficient.

Examples of the general concept of using such impedance units having temperature dependent impedance values, are to be found in U.S. Pat. Nos. 5,200,686 and 5,489,834.

However, the solutions presented in these disclosures are of a kind that enable no exchange of digital information between a battery pack and a device to which the battery pack is attached.

Modern digital devices, such as mobile telephone terminals, have large digital processing capabilities. In addition to performing all necessary functions related to communication in a telecommunication network, processing power can be used to handle also other tasks. A task relevant to the present invention is that of measuring impedance variations due to temperature changes, as well as interpreting the variations in terms of temperature of the battery.

A typical example of the state of the art, where digital information is exchanged between a battery and a device, is to be found in U.S. Pat. No. 5,582,928.

It is shown a supply battery arrangement comprising two voltage supply terminals and a universal terminal having a dual function as a communication line for both thermal information and digital information.

To achieve the dual mode function of the universal terminal, a thermistor is connected between the terminal and signal ground, in parallel with a digital signal port of a microprocessor. It is to be noted that the thermistor is never disconnected from the digital circuitry when not utilized to supply thermal information.

Another example of the state of the art in the field of the present invention is disclosed in U.S. Pat. No. 5,371,453. Temperature information, in the form of a voltage drop across the terminals of a thermistor and digital information is transmitted between a battery and a device to which the battery is attached.

Although the solution disclosed in U.S. Pat. No. 5,371,453 discloses features within the field of the present invention, it is to be noted that the solution disclosed in U.S. Pat. No. 5,371,453 does not utilize a common communication line through which both analog temperature information and digital information are exchanged. In fact, it is explicitly stated that the only digital information transmitted via the communication line is in the form of a simple one-way clock signal.

SUMMARY OF THE INVENTION

In view of prior art as discussed above, a number of problems remain to be solved regarding communication of analog thermal information and digital information via a single communication line between a battery pack and a device.

A problem solved by the present invention is to enable temperature measurement of a battery pack attached to a device, where the measurement takes place via a communication line capable of exchanging both analog and digital information between the battery and the device.

Within the field of the general problem as stated above, there is a problem of how to enable temperature measurement of a battery pack attached to a device only on well-defined predetermined occasions.

The object of the present invention is to overcome the problems as stated above. This is, in short, achieved by providing a method and an apparatus for determining temperature of a battery pack attached to an electric device. The method entails controlling the means of an arrangement, where an exchange of digital information between the battery and the device takes place, followed by steps of connecting a thermistor to the communication line for a period of time, in order to enable a reading of an impedance value corresponding to a temperature.

In some more detail, it is shown a method of determining a temperature of a battery pack connected via a single communication line to an electric device. The battery pack and electric device both comprise control and signaling means capable of exchanging digital signal sequences. The battery pack comprises an impedance unit having a temperature dependent impedance value. The method comprises the steps of:

transmitting a first signal sequence from the control and signaling means of the device to the control and signaling means of the battery pack;

interpreting the first signal sequence, and in dependence on the interpretation performing the steps of:

disconnecting the control and signaling means of the battery pack from the communication line;

connecting the temperature dependent impedance unit to the communication line;

supplying an electric current of a predetermined level to the impedance unit via the communication line;

measuring a voltage level on the communication line;

calculating an impedance value based on the supplied current level and the measured voltage level;

interpreting the calculated impedance value as a temperature of the battery pack;

disconnecting the temperature dependent impedance unit from the communication line; and connecting the control and signaling means of the battery pack to the communication line.

It is also shown an apparatus comprising means for performing the invention as summarized above.

An advantage of the present invention is that it enables exchange of analog temperature information via a single digital communication line between a battery and an electric device to which the battery is attached.

Another advantage of the present invention is that it connects a temperature-sensing device, such as e.g. a thermistor, to the communication line, only when needed for the temperature measurement. It is thus possible to avoid any interference on the digital communication line, such as e.g. voltage drops or unnecessary current consumption.

BRIEF DESCRIPTION OF THE DRAWINGS

FIGS. 2a and 2b show exemplary schematic flow charts of a method according to the present invention.

DETAILED DESCRIPTION OF PREFERRED EMBODIMENTS

Figure 1:
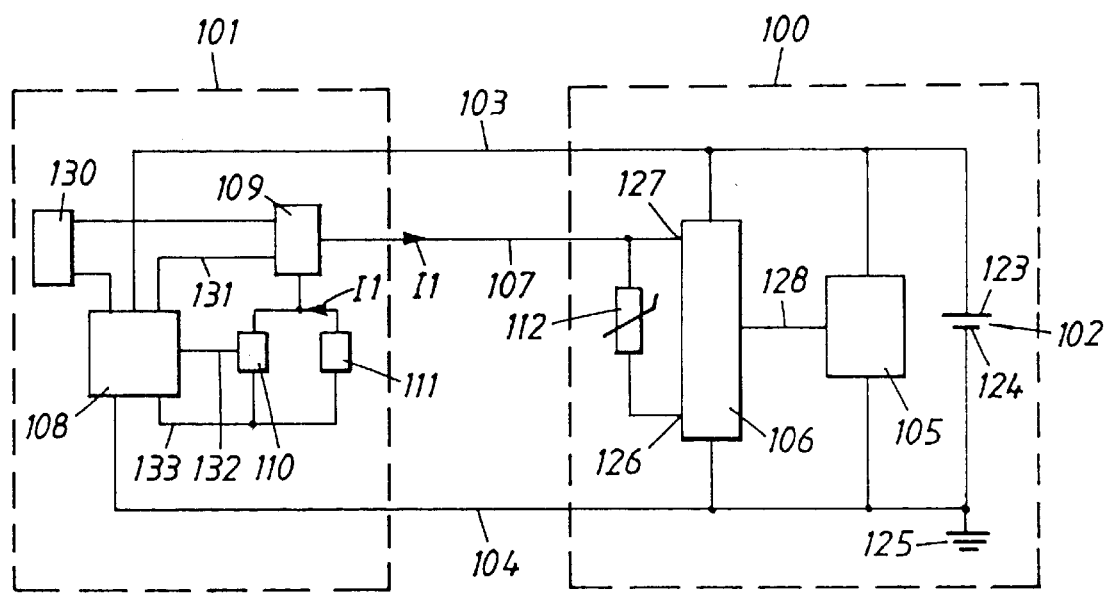
FIG. 1 shows a schematic view of an exemplary arrangement according to the present invention, comprising a battery pack attached to an electric device.

A first preferred embodiment of an exemplary arrangement according to the present invention is shown schematically in FIG. 1. A battery pack 100 is electrically and mechanically connected to an electric device 101. The battery pack 100 and the device 101 are schematically shown as boxes in order to stress the fact that the present invention relates to a diverse collection of battery powered electrical implements. For the same reason, the actual means for mechanical and electrical connection have been omitted from the illustration. It is also to be understood that the battery pack 100 and the device 101 are mechanically and electrically attachable and detachable from each other.

A typical example of this kind of arrangement is a portable mobile telephone terminal equipped with a detachable battery pack. However, it is to be understood that a person skilled in the art is capable of implementing the present invention in other types of battery powered devices without applying any inventive efforts.

The battery pack 100 comprises a battery cell 102, or a collection of cells, with a positive terminal 123 and a negative terminal 124. The negative terminal is designated as being signal ground as indicated by the signal ground symbol 125. A battery processor 105 and an input/output (I/O) unit 106 is also comprised in the battery pack 100, both of which are connected to the positive terminal 123 of the battery cell 102 and signal ground 125. The battery processor 105 is connected to the I/O unit 106 via a first signal connection 128. Although the connection 128 is illustrated as a single lead, it is to be understood that this is only for illustrative purposes, and hence any form of multi-lead data bus etc. is feasible.

Within the battery processor 105 are means for performing processing tasks ruled by software, as is known in the art. Although not shown in the figure, means such as control logic and memory, read-only as well as random access, are comprised in the battery processor 105.

The I/O unit 106 has a number of terminals, of which only two are illustrated in FIG. 1 in addition to the connections to the battery cell 102. A bi-directional port 127 and an out port 126.

A thermistor 112 is connected to both the bi-directional port 127 and the out port 126. Since FIG. 1 is only a schematic illustration of the arrangement according to the invention, the locations of the different parts of the battery processor 105 with respect to each other are not to be taken literally. For example, the thermistor 112 is preferably located in physical contact with the battery cell 102 in order to be sensitive to temperature changes in the cell 102.

Figure 3:
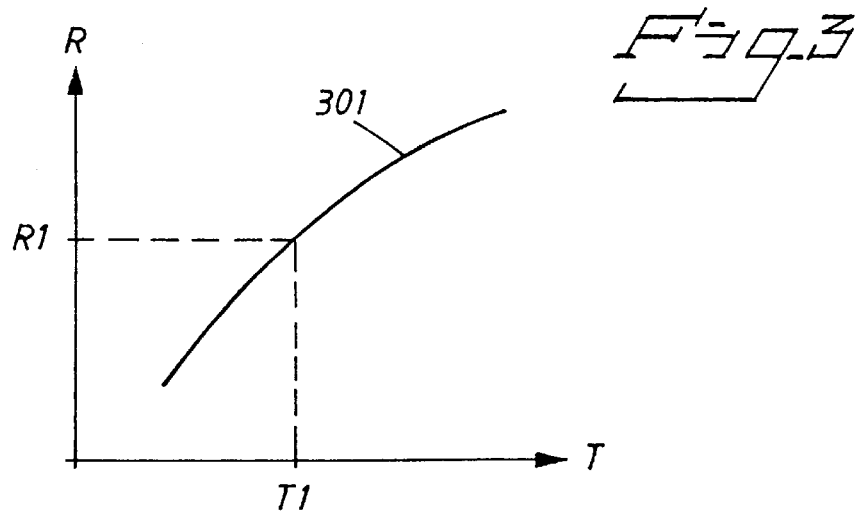
FIG. 3 shows an exemplary schematic diagram of a relation between temperature and resistance for a thermistor.

FIG. 3 illustrates a typical resistance-temperature (R(T)) relation 301. That is, for a given temperature T1 the corresponding resistance R1 is determined by the R(T) relation.

The battery processor 105 is capable of, by means of software running in its logic circuits, controlling signal flow through the I/O unit 106. In particular, as it is a prerequisite for the present invention, the battery processor 105 performs the task of connecting and disconnecting the bi-directional port 127 and the out port 126. In practical terms this may, within the I/O unit 106, be realized by switches, which connects the ports either to a high impedance state, or to a low impedance state, that is to signal ground 125.

Needless to say, the circuitry in the battery pack 100 may be physically located either in separate units, such as illustrated in FIG. 1, or integrated into one single unit.

The electric device 101 comprises a device processor 108 which is connected to the battery cell 102 in the battery pack 100 via a supply lead 103 and a signal ground lead 104. Connected to the device processor 108 are a number of units, some of which are dedicated to the specific task of the device 101, schematically illustrated by a single device specific circuit block 130. One example of a device specific block 130 is an input/output unit similar to the I/O-unit comprised in the battery pack 100. Such an input/output unit may perform the task of mediating signal sequences from the device processor 108 and the battery processor 105 via the communication line 107. In fact, in the present example such functionality of the device specific block 130 is assumed.

However, the device block may also comprise, in the case of a telephone terminal, a radio transceiver and all other necessary telephone specific means as is well known in the art.

The device processor 108 is further connected to a switch 109 via a switch control connection 131, an analog-to-digital (A/D) converter 110 and a current generator 111 via a common control connection 133. Both the A/D converter 110 and the current generator 111 are also connected to the switch 109. The A/D converter 110 generates digital output, as is known in the art, and is connected via a data read connection 132 to the device processor 108.

A communication line 107 is connected between the switch 107 and the bi-directional port 127 of the battery pack 100. As indicated above, it is outside the scope of the present invention to specify any particular connection means, such as electric and mechanical connectors, between the device 101 and the battery pack 100.

Similar to the battery processor 105 in the battery pack 100, the device processor 108 comprises means for performing processing tasks ruled by software, as is known in the art. Although not shown in the figure, means such as control logic and memory, read-only as well as random access, are comprised in the device processor 108.

Software running in the device processor 108 controls the switch 109 to the effect that the switch 109 can be in either one of a first state and a second state. In the first state the communication line 107 is connected to the device specific circuits block 130 and disconnected from the A/D-converter 110 and the current generator 111. In the second state the communication line 107 is disconnected from the device specific circuits block 130 and connected to the A/D-converter 110 and the current generator 111.

A method of determining a temperature of the battery pack 100, which ideally corresponds to the temperature of the battery cell 102, will now be described with reference to flow charts illustrated in FIGS. 2a and 2b. The determination of the temperature is to be considered from the point of view of the electric device 101. That is, information representing the physical parameter temperature is to be transferred from the battery pack 100 to the device processor 108 of the device. As will be discussed further below, a voltage level as measured across the thermistor 112 is the information representing the temperature of the battery pack 100.

All steps are considered to be realized by means of software instructions running in the device processor 108 and the battery processor 105, and implemented in a manner which is assumed to be within the grasp of a person skilled in the art.

A more detailed description of how the information regarding temperature is used or processed within the device 101, after being determined by the inventive method, is outside the scope of the present invention. Nevertheless, examples of how the temperature information may be used include displaying the temperature to a user of the device 101 as well as making use of the temperature when controlling re-charging of the battery cell 102.

It is also to be noted that the method comprises a number of sequential steps where information-carrying signals are exchanged between the device processor 108 of the electric device 101 and the battery processor 105 of the battery pack 100. The precise manner in which the software in the processors 105,108 generates, transmits, receives and interprets these signals, as well as the specific format of the signals is assumed to be easily implemented by a person skilled in the art. However, because of the simple fact that a preferred embodiment of the present invention comprises a single communication line 107 between the battery pack 100 and the device 101, a serial communication protocol is to be assumed.

Referring to FIG. 2a, the exemplary method commences with a transmission step 202 performed in the device processor 108. A command representing an order to measure the temperature of the battery pack 100 is transmitted from the device processor 108, via the communication line 107, to the battery processor 105.

Following the transmission step 210, the device processor 108 prepares to wait for the battery processor to perform the steps described below in connection with FIG. 2b, including an acknowledgment of the order to measure the temperature. In a timer step 204 a timer (not shown) is set, according to known technique, to trigger in a time-out step 206 a time-out condition at a predetermined moment in time as measured by an internal clock (not shown). The duration of time until this time-out is in this embodiment predetermined in terms of a fixed time limit stored in the device processor memory. The exact duration of the waiting period is assumed to be such that the steps performed by the battery processor 105, as described below, will be satisfactorily executed.

When the preparation for the time-out is done in the timer step 204, the device processor 108 receives an acknowledging signal from the battery processor 105 that the transmitted command has been successfully received in the battery processor 105. The content of the acknowledging signal is preferably in the form of an echo of the temperature measurement command sent to the battery processor 105 in step 202. This acknowledging echo is in FIG. 2a illustrated in three steps, a reception step 208, in which the acknowledging command is received, and an interpretation step 210 where a check is made that the command has been interpreted by the battery processor 105 as being the correct (temperature measurement) command. If the echoed command is found to be incorrect, the method is terminated, as indicated by a decision step 212, in which a negative acknowledging command leads to an immediate interruption of the method and a positive acknowledgment leads to a continuation of the method.

Figure 2B:
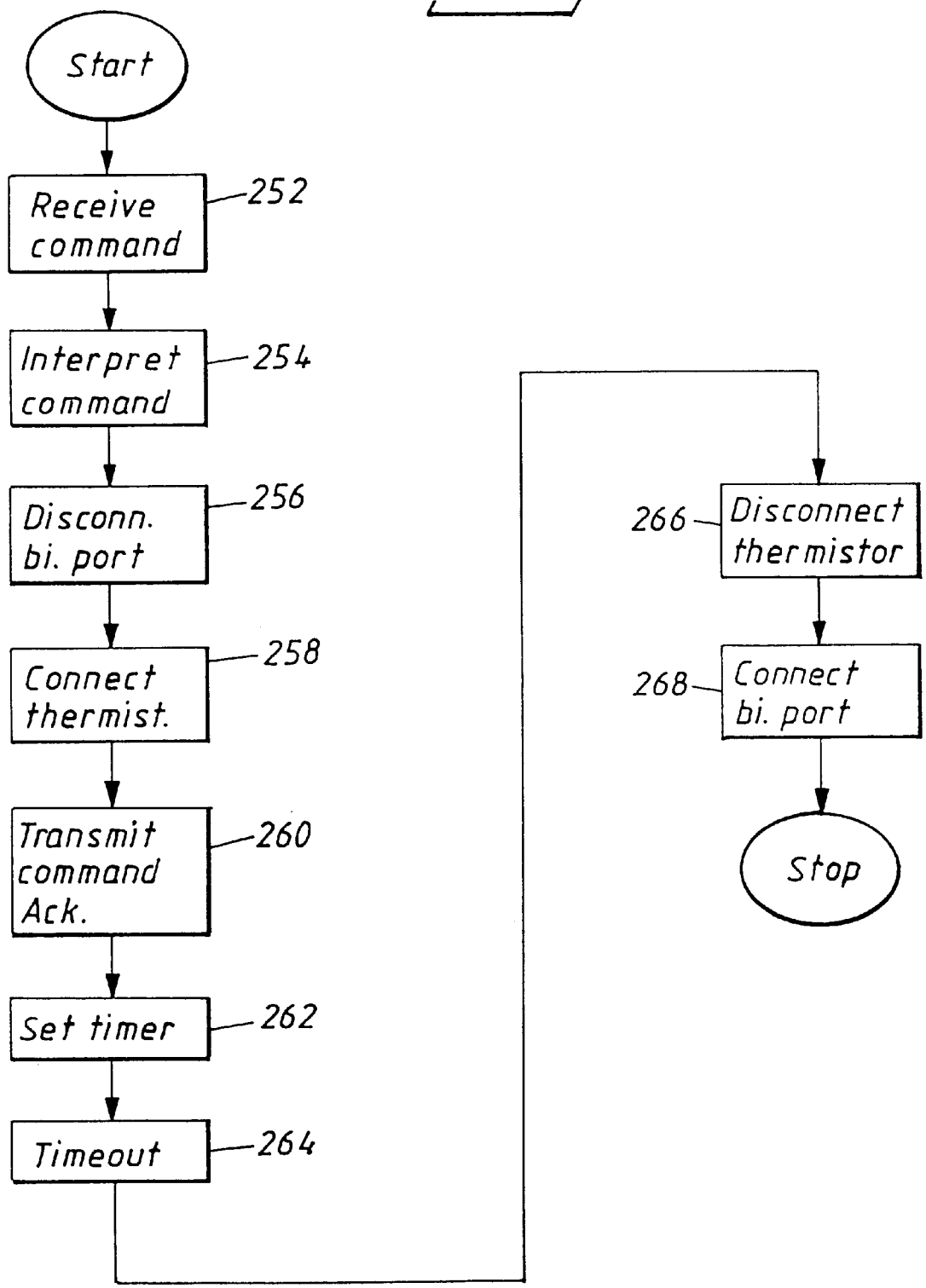

Continuing now with steps performed in the battery processor 105, it is illustrated in FIG. 2b a receiving step 252. The battery processor 105 receives the command transmitted via the communication line 107 from the device processor 108. The exact path of the command, via the I/O unit 106 to the battery processor 105 is considered to be irrelevant in terms of explaining the invention and will hence not be discussed further.

The received command is then interpreted in an interpretation step 254. Depending on whether or not the command is coded in any way or whether it is one of many possible commands within a larger set of commands, this interpretation may be more or less complicated. For the purpose of this description, it is assumed that the command received is interpreted such that a result is obtained which entails a positive identification of the order by the device processor 108 to measure the temperature of the battery pack 100.

As a consequence of the positive interpretation of the order in the interpretation step 254, the battery processor 105 commences a procedure to enable a determination of the battery temperature.

In a disconnection step 256, the battery processor 105 controls a switch (not shown) within the I/O unit 106 to disconnect the communication line 107 from the I/O unit 106. In practice this entails connecting the bi-directional port 127 via an impedance unit (not shown), having a very high impedance level, to signal ground 125.

In a connection step 258 the battery processor 105 controls a switch (not shown) within the I/O unit 106 to connect the thermistor 112, via the I/O unit 106, to signal ground. In practice this entails connecting the out port 126 to signal ground 125.

In an acknowledgment step 260, the received command to measure the temperature is echoed back to the device processor 108 in order to acknowledge that the battery processor 105 has prepared the circuitry in the battery pack for temperature measurement.

In order to enable the device processor 108 to perform the steps of measuring the temperature, the battery processor 105 performs a sequence of waiting, as will be described in the following steps. The duration of this waiting is in this embodiment predetermined in terms of a fixed time limit stored in the battery processor memory. In a timer step 262 a timer (not shown) is set, according to known technique, to trigger in a time-out step 264 a time-out condition at a predetermined moment in time as measured by an internal clock (not shown) in the battery processor 105. The duration of time until this time-out, i.e. the waiting period, is predetermined in terms of a fixed time limit stored in the battery processor memory. The duration of the waiting period is assumed to be such that the steps performed by the device processor 108, described below, will be satisfactorily executed.

Returning now to a description of steps performed in the device processor 108, after the positive acknowledgment by the battery processor 105 as described above in connection with steps 260,208,210 and 212.

In a first switching step 214, the device processor 108 disconnects the device specific circuitry 130 from the communication line 107 and connects both the A/D converter 110 and the current generator 111 to the communication line 107. In practice this step is performed in accordance with known digital technique by the device processor 108 in that it controls the switch 109 via the switch control connection 131.

In a current generating step 216, the device processor 108 controls the current generator 111, via the common control connection 133, to generate a predetermined constant electric current I1. The current I1 flows via the switch 109 through the communication line 107 and through the thermistor 112 and returns via the signal ground lead 104.

During the current generating step 216, the device processor 108 also performs a voltage detection step 218. The predetermined constant current I1 passing through the thermistor 112 results in a voltage drop across the thermistor. This voltage drop, having an analogue voltage level V1, is detected by the A/D converter and is according to known art converted to a digital value which is read by the device processor 108 via the data read connection 132.

Following the reading of the voltage level V1 in the detection step 218, the device processor 108 performs a calculation step 220. The software in the device processor 108 has access to the voltage level V1 as well as the predetermined current level I1. In simple terms, the calculation entails dividing the voltage level V1 with the current level I1, which results in a resistance value R1 according to Ohm's law.

In an interpretation step 222 the device processor 108 then performs an interpretation of the calculations made in the calculation step 220. The resistance-temperature relation R(T), illustrated in FIG. 3, is according to known art stored in the processor 108 and used to extract the temperature T1 corresponding to the resistance value R1.

Following the calculation and interpretation, the device processor 108 disconnects the A/D converter 110 and the current generator 111 from the communication line 107 and reconnects the device specific circuitry 130 to the communication line 107. In practice this is performed in a second switching step 224 in the same manner as in the first switching step 214.

Returning now to steps performed by the battery processor 105, it is to be noted that the waiting period, as discussed in connection with the waiting in steps 262 and 264 above, has lapsed.

In a disconnection step 266 the battery processor 105 controls the I/O unit 106, via the connection 128, to disconnect the thermistor 112 from signal ground 125, that is reversing the connection step 258.

To conclude the method, the battery processor 105 performs a connection step 268 in which the bi-directional port 127 is reconnected to the communication line 107, thus re-enabling exchange of digital information between the battery processor 105 and the device processor 108.

Although preferred embodiments of the method and apparatus of the present invention have been illustrated in the accompanying Drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. A method of determining a temperature of a battery pack connected via a single communication line to an electric device, said battery pack and electric device both comprising control and signaling means capable of exchanging digital signal sequences, said battery pack comprising an impedance unit having a temperature dependent impedance value, said method comprising the steps of:

transmitting a first signal sequence from the control and signaling means of the device to the control and signaling means of the battery pack; and interpreting the first signal sequence to determine whether to initiate a temperature determining procedure, and in dependence on the interpretation performing the steps of:

disconnecting the control and signaling means of the battery pack from the communication line and connecting the temperature dependent impedance unit to the communication line in response to initiation of the temperature determining procedure;

supplying an electric current of a predetermined level to the impedance unit via the communication line;

measuring a voltage level on the communication line;

calculating an impedance value of the temperature dependent impedance unit based on the supplied current level and the measured voltage level;

interpreting the calculated impedance value as a —temperature of the battery pack; and disconnecting the temperature dependent impedance unit from the communication line and connecting the control and signaling means of the battery pack to the communication line in response to completion of at least a portion of the temperature determining procedure.

2. The method of claim 1 wherein the step of transmitting the first signal sequence is preceded by a step of encoding an order to measure a temperature into a digital information block which forms at least part of the first signal sequence in the following transmitting step.

3. The method of claim 1 wherein the step of interpreting the first signal sequence includes a step of decoding at least part of the first signal sequence into an order to measure a temperature.

4. The method of claim 1 wherein the step of supplying the electric current to the communication line is preceded by the steps of:

disconnecting the control and signaling means of the device from the communication line;

connecting a current generator and an analog-to-digital converter to the communication line after disconnecting the control and signaling means of the device;

and following the step of measuring the voltage level are the steps of:

disconnecting the current generator and the analog-to-digital converter from the communication line; and connecting the control and signaling means of the device to the communication line.

5. An apparatus for determining a temperature of a battery pack connected via a single communication line to an electric device, said battery pack and electric device both comprising control and signaling means capable of exchanging digital signal sequences, said battery pack comprising an impedance unit having a temperature dependent impedance value, said apparatus comprising:

means for transmitting a first signal sequence from the device to the battery pack;

means for interpreting the first signal sequence to determine whether to initiate a temperature determining procedure;

means for disconnecting the control and signaling means of the battery pack from the communication line and for connecting the temperature dependent unit to the communication line in response to initiation of the temperature determining procedure;

means for supplying an electric current of a predetermined level to the temperature dependent impedance unit via the communication line;

means for measuring a voltage level on the communication line;

means for calculating an impedance value of the temperature dependent impedance unit based on the supplied current level and the measured voltage level;

means for interpreting the calculated impedance value as a temperature of the battery pack; and means for disconnecting the temperature dependent impedance unit from the communication line and for connecting the control and signaling means to the communication line in response to completion of at least a portion of the temperature determining procedure.

6. The apparatus of claim 5 further comprising means for encoding an order to measure a temperature into a digital information block which forms at least part of the first signal sequence.

7. The apparatus of claim 5 further comprising means for decoding at least part of the first signal sequence into an order to measure a temperature.

8. The apparatus of claim 5 wherein the means for supplying an electric current is a current generator, and the means for measuring a voltage level is an analog-to-digital converter, and wherein the apparatus further comprises:

means for disconnecting the control and signaling means of the device from the communication line and for connecting the current generator and the analog-to-digital convert to the communication line in response to initiation of the temperature determining procedure; and means for disconnecting the current generator and the analog-to-digital converter from the communication line and for connecting the control and signaling means of the device to the communication line in response to completion of at least a portion of the temperature determining procedure.

9. An apparatus for determining a temperature of a battery pack, comprising:

a communication line operable to carry digital signal sequences between an electric device and the battery pack;

a switching unit associated with the battery back adapted to selectively connect a temperature sensor to the communication line in response to initiation of a temperature determining mode; and a switching unit associated with the electric device adapted to selectively connect temperature detection circuitry to the temperature sensor via the communication line in response to the initiation of the temperature determining mode.

10. The apparatus of claim 9, wherein the temperature sensor comprises a temperature sensor having a temperature dependent impedance value.

11. The apparatus of claim 10, wherein the temperature sensor comprises a thermistor.

12. The apparatus of claim 9, wherein the temperature detection circuitry comprises:

an analog-to-digital converter adapted to convert a voltage associated with the communication line to a corresponding digital representation; and a current generator adapted to supply a current to the temperature sensor via the communication line.

13. The apparatus of claim 12, wherein the temperature detection circuitry further comprises a processing unit coupled to the analog-to-digital converter and adapted to calculate a temperature of the battery pack from at least the digital representation of the voltage.

14. The apparatus of claim 9, wherein the switching unit associated with the electric device disconnects device specific circuitry from the communication line and connects the temperature detection circuitry to the communication line in response to the initiation of the temperature determining mode.

15. The apparatus of claim 14, wherein the switching unit associated with the electric device disconnects the temperature detection circuitry from the communication line and reconnects the device specific circuitry to the communication line in response to a predetermined condition of the temperature determining mode.

16. The apparatus of claim 9, wherein the switching unit associated with the battery pack disconnects an input/output unit of the batter pack from the communication line and connects the temperature sensor to the communication line in response to the initiation of the temperature determining mode.

17. The apparatus of claim 16, wherein the switching unit associated with the battery pack disconnects the temperature sensor and from the communication line reconnects the input/output unit to the communication line in response to a predetermined condition of the temperature determining mode.

* * * * *